United States Patent
Stockenberg et al.

(10) Patent No.: US 7,398,286 B1
(45) Date of Patent: Jul. 8, 2008

(54) METHOD AND SYSTEM FOR ASSISTING IN BACKUPS AND RESTORE OPERATION OVER DIFFERENT CHANNELS

(75) Inventors: John E. Stockenberg, Norfolk, MA (US); William J. Elliott, IV, Leominster, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/052,325

(22) Filed: Mar. 31, 1998

(51) Int. Cl.
*G06F 12/00* (2006.01)
*G06F 7/00* (2006.01)

(52) U.S. Cl. .................. 707/202; 707/10; 707/201; 707/204; 707/205; 707/206

(58) Field of Classification Search ........... 707/1–10, 707/100–104.1, 200–206; 709/200–253; 713/188, 201, 186
See application file for complete search history.

(56) References Cited

U.S. PATENT DOCUMENTS

| | | | | |
|---|---|---|---|---|
| 4,710,870 A | * | 12/1987 | Blackwell et al. | 714/6 |
| 5,133,065 A | * | 7/1992 | Cheffetz et al. | 714/2 |
| 5,146,605 A | * | 9/1992 | Beukema et al. | 710/1 |
| 5,204,954 A | * | 4/1993 | Hammer et al. | 710/22 |
| 5,276,860 A | * | 1/1994 | Fortier et al. | 714/6 |
| 5,544,347 A | * | 8/1996 | Yanai et al. | 711/162 |
| 5,550,976 A | * | 8/1996 | Henderson et al. | 709/201 |
| 5,740,801 A | * | 4/1998 | Branson | 128/653.1 |
| 5,742,792 A | * | 4/1998 | Yanai et al. | 710/1 |
| 5,862,322 A | * | 1/1999 | Anglin et al. | 395/185.1 |
| 5,877,819 A | * | 3/1999 | Branson | 348/701 |
| 5,889,943 A | * | 3/1999 | Ji et al. | 743/201 |
| 5,893,919 A | * | 4/1999 | Sarkozy et al. | 711/114 |
| 6,092,066 A | * | 7/2000 | Ofek | 707/10 |
| 6,101,320 A | * | 8/2000 | Schuetze et al. | 709/206 |
| 6,145,088 A | * | 11/2000 | Stevens | 714/2 |
| 6,148,412 A | * | 11/2000 | Cannon et al. | 714/6 |
| 6,151,709 A | * | 11/2000 | Winkel | 717/173 |

FOREIGN PATENT DOCUMENTS

EP 0316251 A2 * 9/1988
EP 0303856 B1 * 4/1995

* cited by examiner

*Primary Examiner*—Ella Colbert
(74) *Attorney, Agent, or Firm*—Theodore A. Chen; Krishnendu Gupta

(57) ABSTRACT

A method and system for assisting with backup and restore operations of data stored in a data storage system is provided. The server and client processes of the backup and restore application include software which allow both processes to communicate with one another either over a network or through the data storage system. The server and client processes are capable of recognizing the calls for both types of communication mechanisms needed for either network or data storage system communications. Once the type of call is recognized the processes can direct the call to the appropriate communication mechanism.

20 Claims, 7 Drawing Sheets

METHOD AND SYSTEM FOR ASSISTING IN BACKUPS AND RESTORE OPERATION OVER DIFFERENT CHANNELS

FIELD OF THE INVENTION

The invention relates generally to software for the backup and restoration of data. In particular, the invention relates to a method and a system for assisting with the backup and restore of data stored in a storage system through the use of different types of communication channels.

BACKGROUND OF THE INVENTION

Data storage systems are used with a number of applications, residing on host computers connected to the data storage system, in which the virtually continuous availability of data is used for the operation of business or other entities using the applications. Generally, backup and restore operations are part of a typical information systems (IS) operation that is used to support the needs of the business. Typically, at the end of a business day or some other timeframe, any data stored on the data storage system, including any transactions, are backed up onto reels of tape or some other storage device from the host computers to another computer or server and eventually onto the tape.

With the advent of open systems and client/server technologies, information management has become increasingly complex. For example, the Symmetrix® family of data storage systems manufactured by EMC Corporation, assignee of the present invention, are capable of storing information on a plurality of different types of host systems, including but not limited to host computers or CPUs manufactured by Sun Microsystems, IBM, Hewlett-Packard, Sequent, and Siemens-Nixdorf. As the data storage systems become increasingly effective at storing data from different host computers, it is also becoming important to do both efficient and effective backups of the information contained on the data storage system. A typical application which runs on these host computers is an Oracle relational database application. Such an application is capable of managing and supporting a database which could be both very small or very large, such as hundreds of gigabytes or larger in size. Such a large database requires a high-speed efficient backup in order to prevent the lessening of the processing on the host computer or downtime of the host computer and/or applications.

The usual method of performing such a backup is to perform a backup over a network, such as a local area network (LAN) and wide area network (WAN). The EMC Data Manager (EDM™) product manufactured and sold by EMC Corporation is typical of a centralized high-performance backup system capable of handling the backup and restore needs of a user of an Oracle database (or other types of applications) over an LAN or WAN. However, although it is well known how to do a backup over a network, there are problems associated with such backups. The usual problem is that in order to backup the very large databases contained within an Oracle database, it would be desired to use a very high speed channel for performing the backups. In a network backup often the network bandwidth is not sufficient to perform a truly high-speed backup over the network. Additionally, there is usually other traffic from other servers located on the network which serve to further reduce the bandwidth of the network, causing any backup or restoration operations not to be done in a high speed manner.

The EDM product manufactured and sold by EMC Corporation has a feature termed EDM Direct Connect or Symmetrix DirectConnect which allows for the backup of data to be done without the use of a network. The backup and restoration of data is done directly between the data storage system and the server on which the backup and restore application resides. The host computer, on which the database application resides is not directly used for this backup and restore operation. This functionality is described in assignee's patent applications entitled "Logical Restore from a Physical Backup in a Computer Storage System," "System and Method for Backing Up Data Stored in Mass Storage System Under Control of a Backup Server," "System and Method for Backing Up Data Stored in Multiple Mirrors on a Mass Storage System Under the Control of a Backup Server," "System and Method for Performing File-Handling Operations in a Digital Processing System Using an Operating System-Independent File Map," and "System and Method for Generating an Operating System-Independent File Map" filed on the same day as the present patent application. This DirectConnect product takes advantage of the high-speed channels that connect a data storage system, such as the Symmetrix and the host computer and the server upon which the backup application resides. However, since the DirectConnect product is highly dependent on the internal knowledge of the individual database applications, and knowledge of how the underlying host computer system works (i.e., operating system), it is difficult and time consuming to make the DirectConnect available for use with every type of application residing on host computers with different types of operating systems. Therefore, the DirectConnect product is not currently capable of being utilized for every database or file system application, or operating system that is available on the market. Accordingly, what is needed is a database backup and restore method and system which uses the high-speed communication connection between the storage system and the host computer for certain types of communications, while using the network connection for certain types of communications. Such a hybrid use of both types of connections can be used to solve the problems associated with the use of backup and restore applications designed for the network or for direct communication with a data storage system. The present invention solves this and other problems.

SUMMARY OF THE INVENTION

In accordance with the present invention, a system has a data storage system connected to and in communication with first and second computers. The first and second computers are also part of a computer network. Residing on the first and second computers are first and second processes, respectively. The first and second processes are part of an application that performs backup and restore functions. Also included in the first and second processes are means which allows the first and second processes to determine whether a call coming from the first and second processes are designed for a first communication mechanism or for a second communication mechanism. The first communication mechanism is used for communicating over the network, while the second communication mechanism is used for communicating through the data storage system.

In accordance with another aspect of the present invention, a method for assisting with the backup and restore operations in a computer system is disclosed. According to this embodiment, at least one connection between first and second processes on a network is established. In parallel with establishing the first connection, a second connection between the first and second processes is established through a data storage system.

In accordance with yet another aspect of the present invention, another method for assisting with the backup and restore operations in a computer system is disclosed. In this embodiment, a connection is established between first and second processes over a network. Prior to establishing a second connection over the network, information about a dynamically allocated port is used to establish the second connection. Information about resources on a data storage device is then used to establish a connection between the first and second processes through the data storage system.

BRIEF DESCRIPTION OF THE DRAWINGS

The above and further advantages of the present invention maybe better understood by referring to the following description taken in conjunction with the following drawings in which.

DETAILED DESCRIPTION OF THE PREFERRED EMBODIMENT

Figure 1:
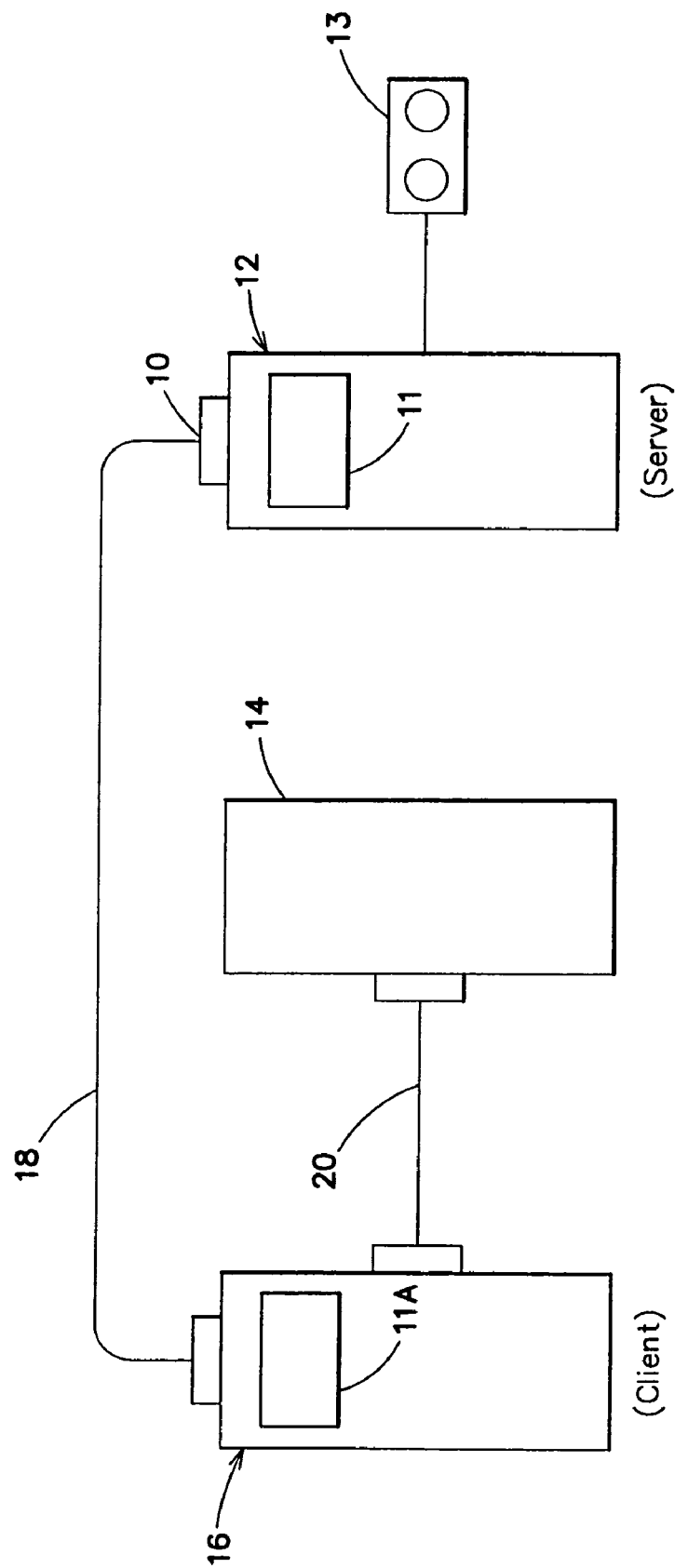
FIG. 1 is a block diagram of a typical system in which a network type of backup and restore application is implemented.

Referring to FIG. 1, a system which embodies a backup and restore application as done over a network is shown. The system 10 is of the client/server type. A backup (or restore) application including a server process 11 resides on computer or server 12. The computer 12 can be of any type of open system computer (e.g., UNIX or NT operating system). Another piece of the backup (or restore) application termed the client process resides on host computer or computer 16. The computer 16 is any type of computer which is compatible with the data storage system 14, including but not limited to computers having a UNIX or NT operating system. Computer 16 is attached to the data storage system 14 over a data communications channel or path 20. The data communications channel 20 may be of the small computer systems interface (SCSI) type as is well known in the art. It should be understood that other types of communication channels (e.g. fiber) may also be used. The server process 11 and the client process 11A are in communication with each other over network 18. The network 18 may be a TCP/IP network or some other type as is well known in the art. In order to perform, for example, a backup operation of data residing on the data storage system 14, either the client process or the server process of the backup application must initiate the backup. If the server process 11 initiates the backup it must essentially establish a communication with the client process 11A. The client process 11A then must retrieve the relevant data to be backed up off of the data storage system 14. It should be understood that either the whole or partial backup (or restore) may be done. Usually, either a full or incremental backup is done. An incremental backup is one in which the only data that is backed up is the data that has changed since the previous backup operation was completed.

Once the relevant data is retrieved, the client process 11A must send the retrieved data over the network 18 back to the server process 11. The server process 11 then can send the data out to a long term storage device, such as a tape library 13. In order to use the network 18 to establish the connection between the server and client processes 11 and 11A, and then utilize the network 18 for the bilateral movement of both data and information relating to the data (e.g., control and error status), a communication mechanism is used to both open and create the needed connection. In the EDM network backup and restore product, for example, TCP/IP sockets are used to set up the necessary network connections to permit the backup application containing the server process 11 to do either a backup operation or a restore operation from data stored on the long-term storage device 13.

The system 10 of FIG. 1 has several disadvantages. One, it is relying on the network for the communication of all information between the client and server processes. Two, the system 10 really does not utilize the high-speed data communication channel 20, in the backup or restore operations. The data communication channel is only used to allow the computer 16 to retrieve data from the data storage device 14.

Figure 2:
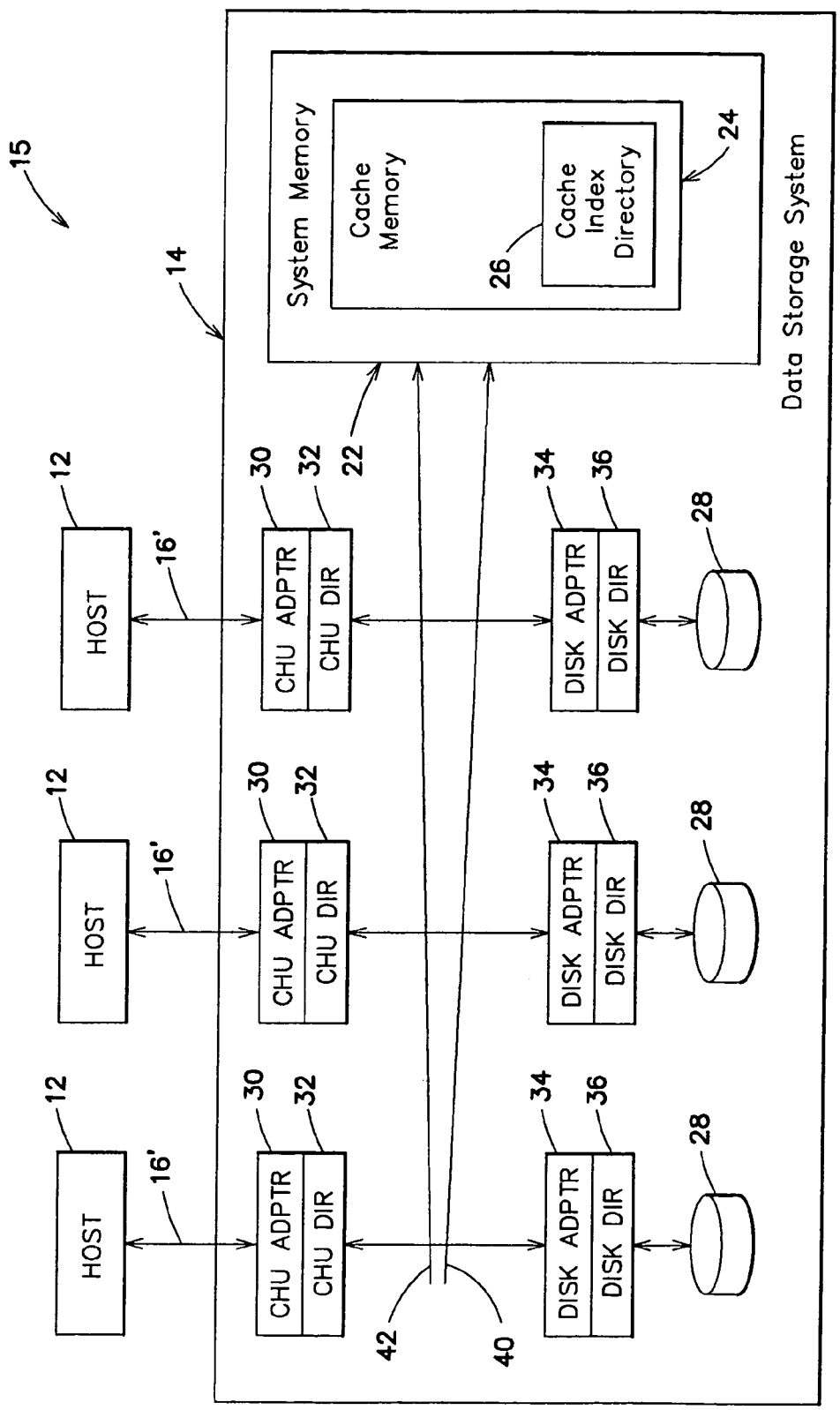
FIG. 2 is a block diagram showing the internal structure of a data storage system as might be used in the system of FIG. 1 or FIG. 3.
Figure 3:
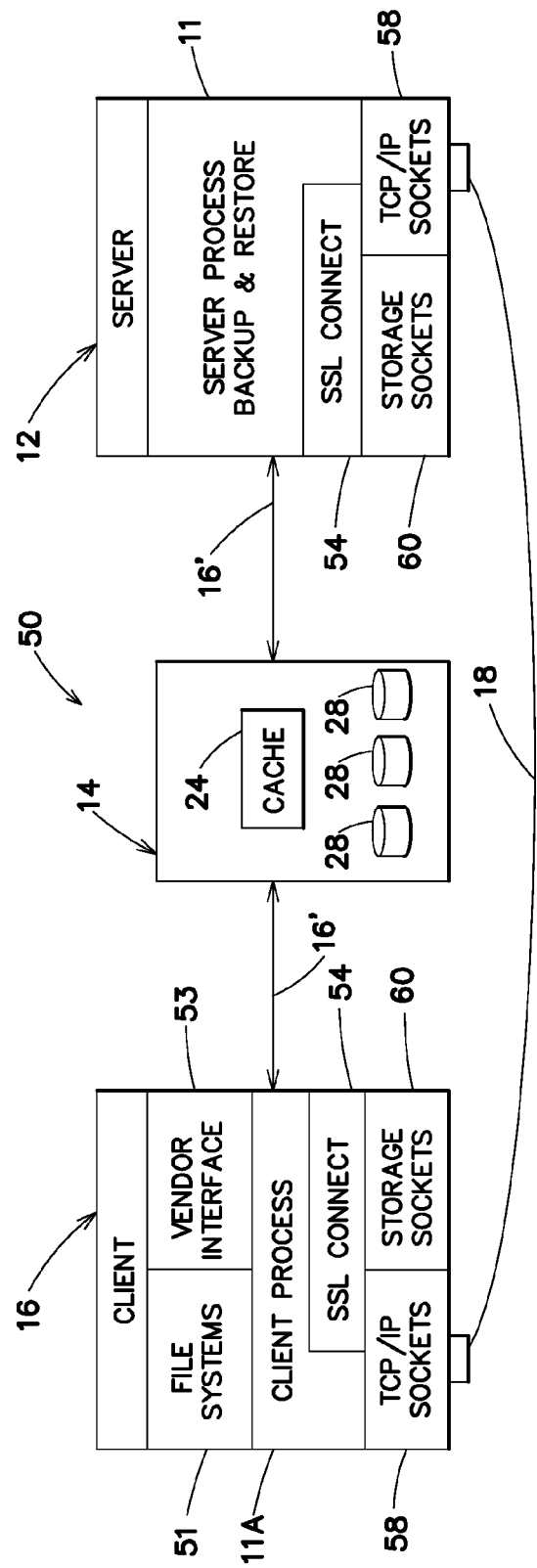
FIG. 3 is a block diagram showing the general architecture required in a system for doing backups over two different communication channels.

Before turning to FIG. 3, which shows the architecture of the present invention, FIG. 2 is shown as an example of the data storage system 14 used in the present invention.

FIG. 2 shows a system 15 which is used with the present invention. It shows a plurality of host computers or processors 12, on which a client process 11A would reside, connected to data storage system 14. Host processors 12, which are typically digital processing units which may include one or more central processing units (CPUs) in main memory. As indicated they might be, for example, UNIX workstations, or NT workstations.

In general, data storage system 14 contains a shared memory 22 that is accessible to all of the host processors 12 that are connected to the data storage system 14. Host processors 12 are each connected to data storage system 14 through respective host connection 16', which, as stated earlier, is typically a high-speed data communication link such as SCSI. To simplify the discussion, only single host connection is shown for each host processor 12. It should be understood, however, that there could in fact be multiple connections between the data storage system 14 and a host processor 12. Data storage system 14 contains the physical memory in which data is stored. The particular manner in which the physical memory within the data storage system is implemented and how it is partitioned is not of central importance to the present invention. An example of a commercially available product to implement the data storage system 14 is the Symmetrix family of products from EMC Corporation, which are high-performance integrated cache disk arrays (ICDA) designed for on-line data storage. The following details about the internal structure and operation of the data storage system 14 generally apply to the Symmetrix data storage systems. However, it should be understood that other designs known to persons skilled in the art may also be used to implement data storage system 14.

Data storage system 14 includes multiple arrays of disk devices 28 (which are also shown in FIG. 3) and a system memory 22. The portion of the system memory implements cache memory 24. The multiple arrays of disk devices 28 provides a non-volatile storage area and cache memory 26 provides a volatile storage area. Each disk device 28 includes a head disk assembly, a microprocessor, and a data buffer which enables the data storage system 14 to provide for the parallel processing of data. In the described embodiment, system memory 20 is implemented by a high-speed random access semi-conductor memory. Within cache memory 24 there is a cache index directory 26 which provides an indication of what data is stored in cache memory 24 and the address of that data in cache memory 24. Cache index directory 26 is organized as a hierarchy of tables for devices, cylinders and tracks, and data records as further described in U.S. Pat. No. 5,206,939 issued Apr. 27, 1993, and incorporated herein by reference.

In general, there is a group of channel adapters 30 and channel directors 32 that provide interfaces through which host processors 12 connect to data storage system 14. Each channel adapter 30 provides for direct attachment to the physical host connections. Channel director 32 contains a microprocessor that manages commands and data from host processors 12 and manages access to cache memory 24. Channel director 32 handles I/O requests from host processors 12. It uses cache index directory 26 which is stored in cache memory 22 to determine whether the requests can be satisfied out of the cache memory 24 or whether the data must be obtained from disk devices 28. It maintains data in cache memory 24 based upon data access patterns. Channel directors 32 write data from host processors 12 into cache memory 24 and update cache index directory 26. They also access cache index directory 26 and read data from cache memory 24 for transfer to host processors 12.

There is also a disk adapter 34 and a disk directory 36 through which each disk array 28 is connected to cache memory 24. Disk adapter 34 interfaces to multiple SCSI buses to which disk device arrays 28 are connected. Disk director 36 manages access to the disk within disk device arrays 28. Disk directors 36 stages data from the disk device arrays 28 to cache memory 24 and it also updates cache index directory 26, accordingly. It also destages or writes back data from "written to" blocks in cache memory 24 to the disk device arrays 28 and again updates each cache index directory 26, accordingly.

Disk adapters 24 and channel adapters 30 access system memory 22 through high-speed parallel line system buses 40 and 42. The data storage system 14 may also include a second pair of high-speed parallel line buses (not shown). System memory 22 is implemented by multiple memory boards. Only one access to a given memory board may occur at any given time, however, multiple memory boards may be accessed at the same time to support concurrent operations.

Now turning to FIG. 3, system 50 of the present invention is shown. As similar to the system 10 shown in FIG. 1, system 50 contains computer or server 12 on which server process of the present application 11 of the backup and restore application resides. Also included in the system 50 is computer or host computer 16 upon which the client process 11A of the present invention resides. Both computers 12 and 16 are connected to data storage system 14 through high-speed data communication channels shown as 16'. In the preferred embodiment of the invention, high-speed data communication channel 16' are SCSI communication channels. It should be understood that other types of communication channels (e.g. fiber) could also be used. Computer 12 and computer 16 are connected to each other through a network shown as 18. In the preferred embodiment of the invention the network is a TCP/IP network, although other rather well known networks could also be used.

Computer 12 contains the server process 11 of the backup and restore application. The server process 11 includes other software modules. For example, included with the server process are three other software modules. In order to allow the server process 11 to facilitate a communication over the network 18 to the client process 11A, a communication mechanism 58 must be used. As in earlier network based backup and restore software applications, the preferred communication mechanism is sockets and, particularly TCP/IP sockets used to create and establish a communication to the client process 11A. Also in the server process 11 is a second communications mechanism shown at 60. In the preferred embodiment of the invention, sockets are used as a communication mechanism to facilitate communications from the server or client processes 11 and 11A through the data storage system 14 to the client or server processes 11A and 11. In the preferred embodiment of the invention, the sockets 60 are STP (Symmetrix Transport Protocol) or SSLsockets, as further described in EMC Corporation's, assignee of the present application, pending patent application entitled "Communication Mechanism and Method for Easily Transferring Information Between Processes" filed on Sep. 29, 1997, having Ser. No. 08/939,772. The manner in which communications and data are transferred through the data storage system 14 with the use of communication mechanism 60 is further described in EMC Corporation's pending patent application entitled "Method and Apparatus for Transfers Employed in a Data Storage System" filed on Dec. 30, 1997, and having Ser. No. 09/000,540. Lastly, included in the server process 11 is a layer of software termed STP or SSLConnect, in the preferred embodiment of the invention, and shown at 54. In the preferred embodiment of the invention, this software allows the server process 11 to determine the mode or type of a particular socket call. For example, if the socket call is a normal or typical TCP/IP socket call it will process that socket call as a "normal" socket request, and use the created socket communication mechanism 58 to create and/or facilitate communications over the network 18. If however, the socket call is one specially designed for use with the data storage system 14, the STP or SSLConnect software will determine that the particular type or mode of that socket call is a socket call specially designed for data storage system 14, and will process that request as a socket call specially utilized for data storage system 14. Thus, the server process 11 will use the socket communication mechanism 60 to create and/or facilitate communications through the data storage system 14.

In the preferred embodiment of the invention a socket call coming from the server process will contain a file descriptor, which typically is an integer. The SSLConnect software is pre-set to make a determination as to the type of socket call based on the value of the file descriptor.

Computer 16, which contains the client process 11A for the backup and restore software, also has its own software modules in the preferred embodiment of the invention. The backup and restore application, has to be capable of handling either database backups of file system backups. For example, the backup and restore software has to be capable of handling backups from an Oracle or other databases (e.g. Sybase, Informix) or backups from a file system such as that which would reside on an NT server. Thus, computer 16 could potentially have software for either file systems shown at 51 or database software, such as that produced and sold by Oracle, as shown at 53. 11A shows the client process of the backup and restore software. Similar to the software residing in server process, the client process also contains the communication mechanism 58 to facilitate communication over the network 18 to the server process 11 residing on computer 12. In the preferred embodiment of the invention, the communication mechanisms 58 are TCP/IP sockets. Client process 11A, similar to server process 11, also wishes to facilitate communication to server process 11 through data storage system 14. It does this with the use of communication mechanism 60. In the preferred embodiment of the invention, communication mechanism 60 is a second set of storage sockets specially designed to facilitate communication through data storage system 14. In the preferred embodiment of the invention, the storage sockets 60 are STP or SSLsockets, as described earlier.

Lastly, a piece of software termed STP or SSLConnect is shown at 54. This software receives the appropriate socket call, and similarly to the STP or SSLConnect software 54 in the server process 11, determines if the socket call is a "normal" socket request or is a socket request designed especially for the data storage system 14, in the manner described earlier. Thus, both the server process 11 and the client process 11A can receive socket calls designed for communication over either the network or the data storage system 14, recognize the type of socket call, and process it accordingly.

The present invention uses both the network 18 (FIG. 3) and the data storage system 14 (FIG. 3) to facilitate communication. In the preferred embodiment of the invention with a file system application, the network 18 is used by the client and server processes 11A and 11 to transfer control and status (error) information about the backup and restore application. The data storage system 14 is used for the transfer of the actual data or files from one process to another.

Figure 4:
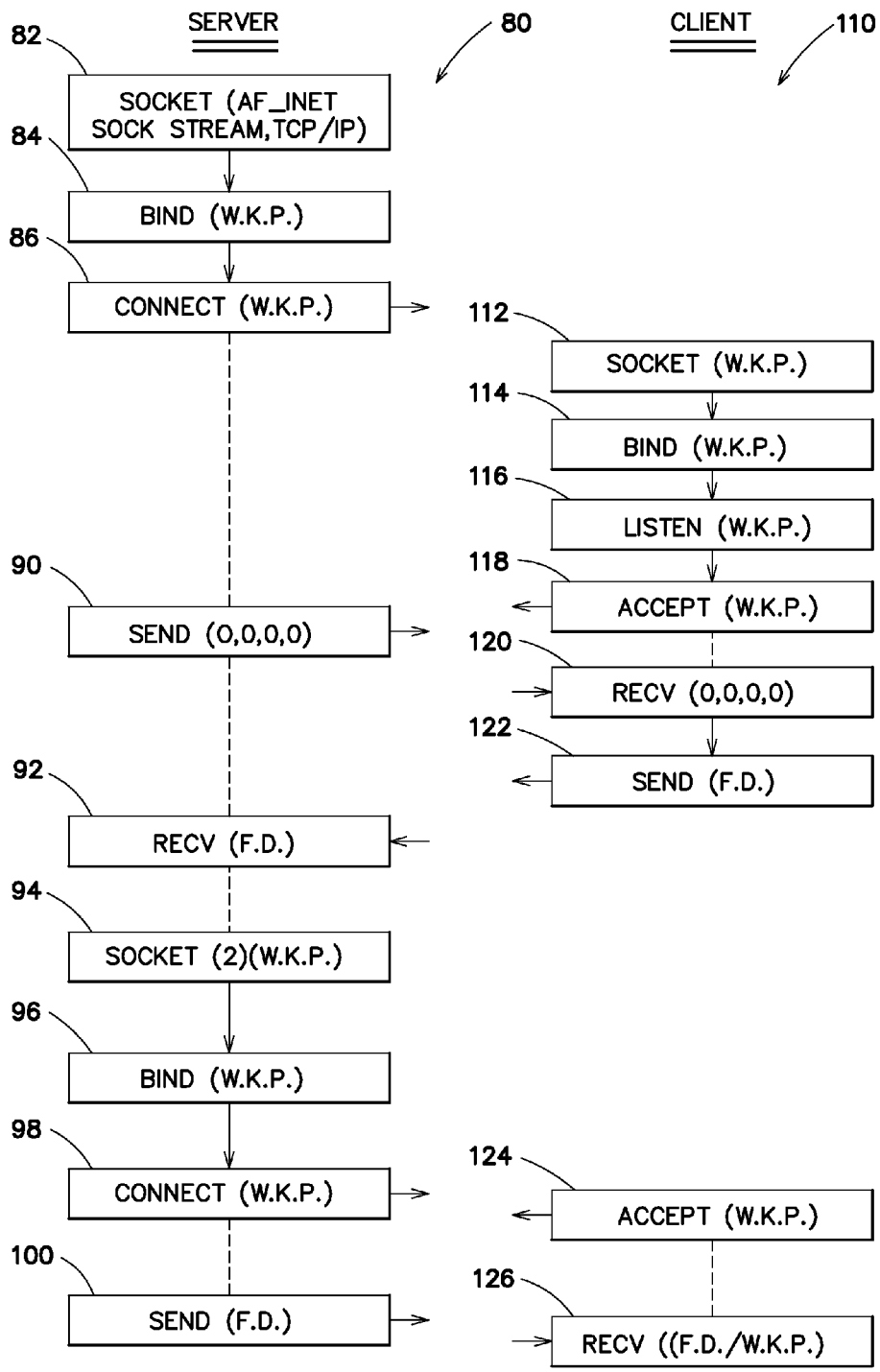
FIG. 4 and FIG. 4A are two flow charts which provide an overview of the operations performed by a client process and a server process in creating and establishing a connection for file system backup or restore.
Figure 4A:
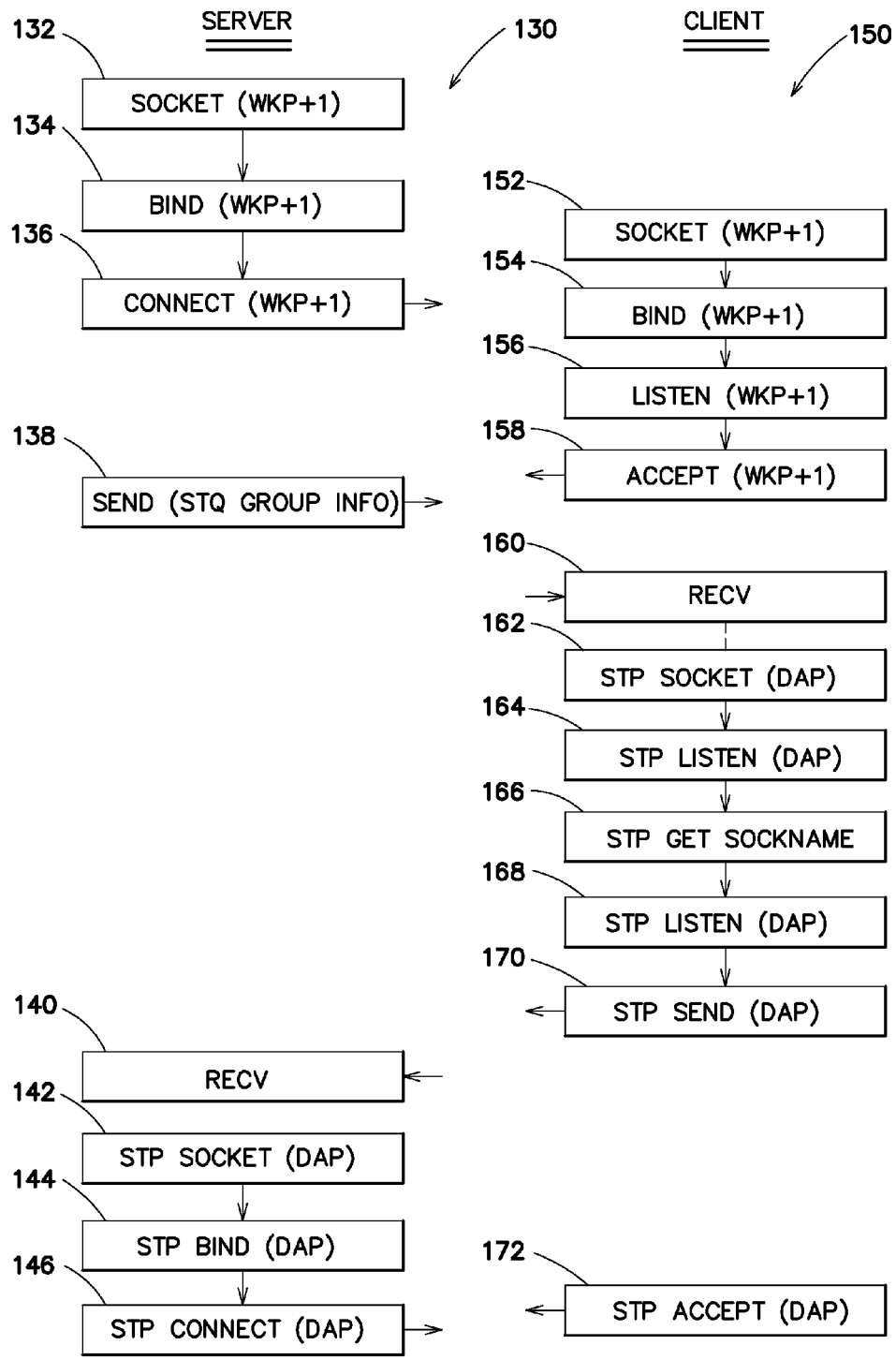
Figure 5:
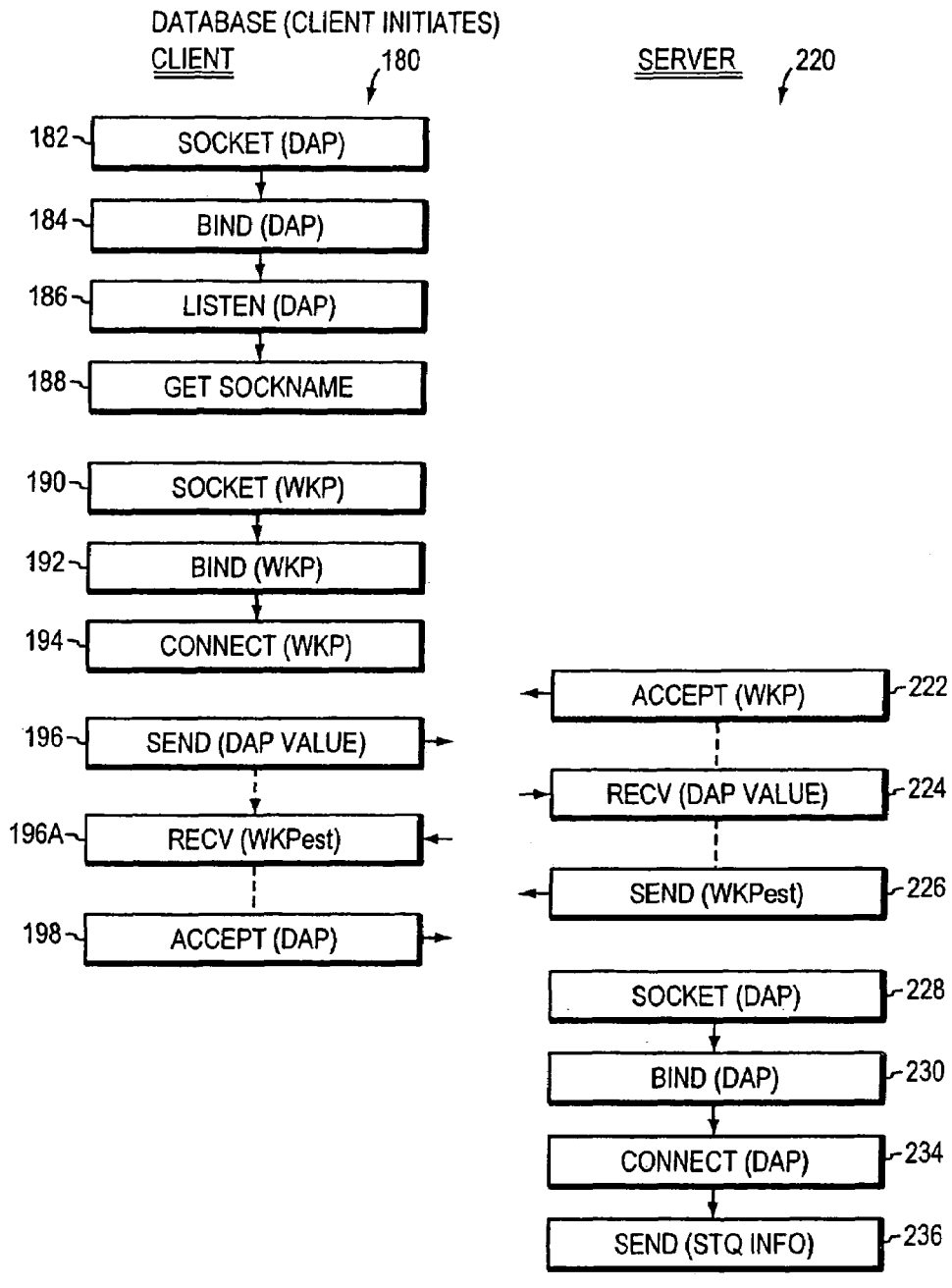
FIG. 5 and FIG. 5A are two flow charts which provide an overview of the operations performed by a client process and a server process in creating and establishing a connection for database system backup or restore.
Figure 5A:
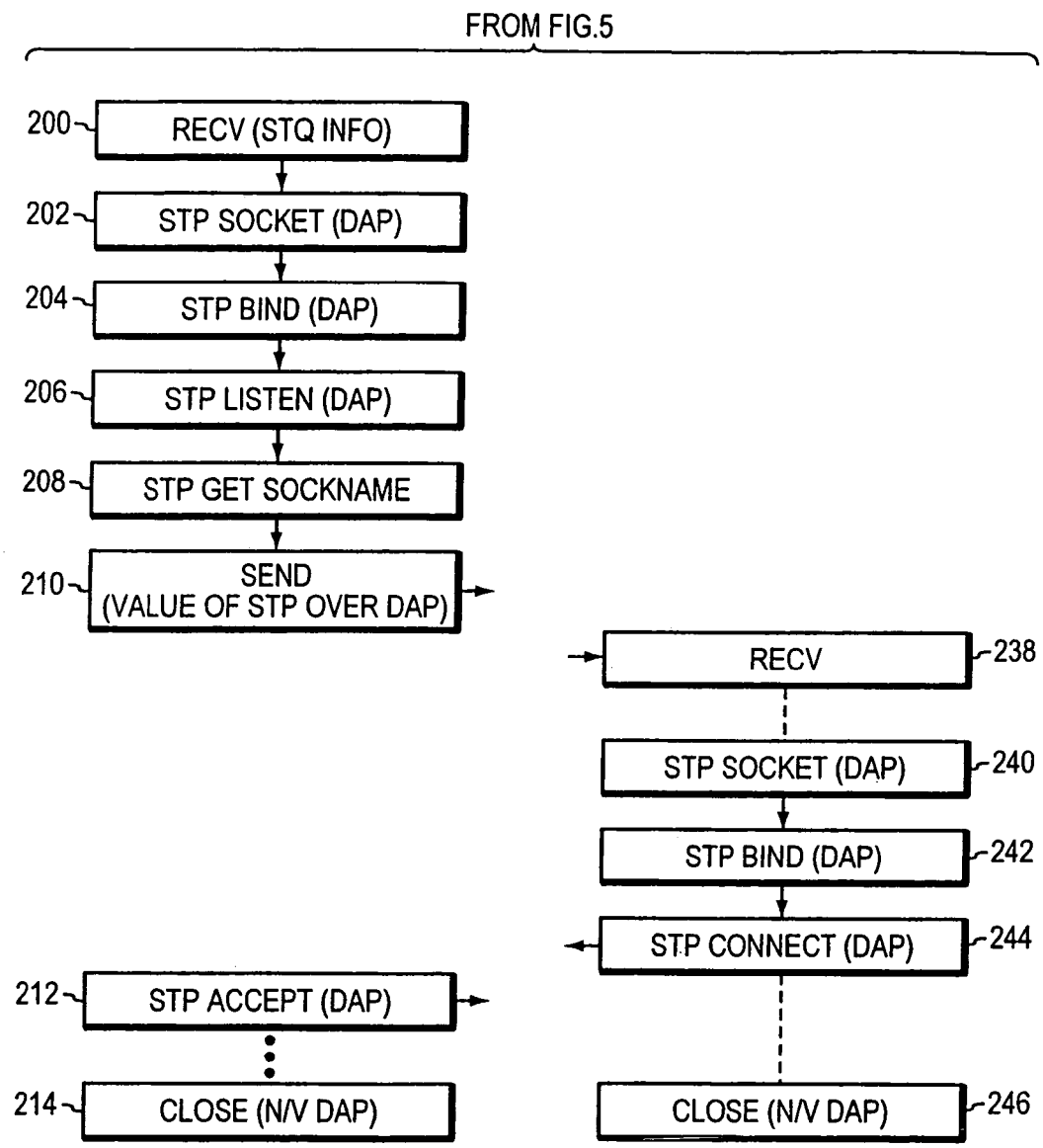

FIGS. 4, 4A, 5 and 5A are of flow charts designed to show how communication over the network is used to establish a one connection, while a connection is being established through the data storage system. FIGS. 4 and 4A show how a file system application sets up connection over both the network and the data storage system. FIG. 4 is representative of communication which would occur in a prior art network backup or restore operation. However the present invention uses the scheme shown in FIG. 4 combined with the one shown in FIG. 4A. FIGS. 5 and 5A show how a database application establishes a connection over the network to establish a connection through the data storage system.

Turning to FIG. 4, indications done by the server process are shown under column 80, while communications done by the client process are shown in a flow chart under column 110.

In a file system backup, the backup is initiated by the server process. Therefore, in order to begin the backup, a socket call is performed. This first socket call is shown as step 82. In order to allocate or create a socket, a socket call designed for the network is used. As shown in step 82, the socket call needs to contain the protocol family, the type, and the actual protocol. In order to use the communication over the network, in the preferred embodiment of the invention, the protocol family is AF_INET, which represents the TCP/IP internet protocol family. Preferably, the type of communication to be used is that of a reliable stream delivery service, and the protocol to be used is TCP/IP.

The use of socket calls over the network is well known to anyone skilled in the art. The showing of the three arguments used in the creation of the socket call is only used to later ascertain the differences between the socket calls used for the network and the socket calls used for the data storage system.

After the socket is created at step 82, it is not associated yet with the local destination address. In the TCP/IP protocol, no local protocol port has yet been assigned to the socket. This is done at step 84. The newly created socket is then bound to a well known port (WKP). Next when a connect command for the socket is issued at step 86, that server process is attempting, through the use of the newly created socket, to connect to a WKP on the client process. Since the socket created in step 82 is created in an unconnected state, the connect command at step 86 is to engage the socket created at step 82 with a foreign destination, such as the client process. Once the connect command is issued in step 86, the socket has indicated its readiness to engage in a connection with other processors.

The arrows and other lines contained in the drawings are included for illustration purposes only. They are meant to show when one process is sending or receiving information from another process.

Now turning to column 110, the actions of the client process are shown. Since the server process has indicated its readiness to accept a connection at step 86, the client process wants to accept the socket. Beginning at steps 112, and continued through steps 114, 116 and 118, the client process begins to respond to the connection request put out by the server process.

At step 112, the client process creates a socket, in a similar manner as done at step 82. Since a socket is but a communication mechanism, each process requires a socket in order to communicate with another process. Next that socket is bound to the WKP at step 114. At step 116, the listen command is used to define the queue of pending connection requests. At step 118, the client process is ready to accept the connection request done by the server at step 86. Once the server process becomes aware that the client process has accepted the connection request, the server process sends over a well known string or a string of zeros, as shown at step 90, to make certain that the server process is connected to the client process on the same WKP. The client process receives the string of zeros at step 120. At this point the client process knows it is connected to the server process on the WKP. The client process also knows that another connection request should be coming. In other words, when the backup operation is initially configured by the user, the relevant configuration file has instructed the client process that there will be two connections in order to perform the backup or the restore. By receipt of the string of zeros, the client process recognizes that the first connection has occurred. Once the client process recognizes that the first connection has occurred, it needs to begin the process for establishing the second connection. At step 122, the client process does this by sending to the server process the file descriptor of the currently accepted socket. The currently accepted socket is the connected socket which was begun at step 82. This file descriptor is sent to the server process at step 122. The server process receives the file descriptor at step 92.

It should be noted that, once the client process sends the file descriptor to the server process at step 122, the client process falls into a loop. The client process is then ready to accept another connection. Once the server process receives the file descriptor, it creates another socket on the same WKP. The numbers contained with the socket are simply to indicate different sockets. The other socket is created at step 94. As previously shown, the socket is followed by bind and connect commands at steps 96 and 98 respectively. The client accepts the connect at step 98 at step 124. It should be noted that all of this is done on the WKP. Once the client process has accepted the connection request at step 124, the server process sends to the client process, at step 100, the file descriptor, which is received by the client process at step 126. Step 100 allows the server to send the file descriptor to the client to let the client know it is in connection with the same server process. The second of the two connections the client process has been told by the configuration file that it is going to receive is now completed. Because two connections have been made, the server process and the client process in essence have two separate channels for use in communication with each other.

Typically, one of the communication channels is used for data communications, while the second is used for error communication.

Now turning to FIG. 4A, which once again at columns 130 and 150 describes additional commands used by the server and client processes to establish a connection, over the network, but through the data storage system. It should be understood that although the connections through the network and the data storage system are shown here as two discrete operations, they are actually done in parallel by the system. It is simply shown here as two discrete operations for ease of reference.

The process begins rather similarly to the one described in 4, except for the fact that the configuration file has instructed the server process to begin the socket creation not on the WKP, but on the WKP plus one. Thus the socket creation beginning at step 132 is on a different WKP. At steps 132, 134, and 136 the socket is created, bound, and indicates its readiness for connection on the WKP plus one. The client process then creates its own socket at steps 152, 154, 156 and 158. At step 158, the socket created on the WKP plus one is accepted. Once the server process is aware that the client process has accepted the process it issues a send command at step 138. The message sent in this send command is information about the relevant Symmetrix Transport Group (STG) to be used.

The STG as explained in the earlier cited pending patent applications of the assignee, is a defining set of resources or devices on the Symmetrix which are actually used as the transport media for information being sent over the relevant socket. Multiple STGs can be configured on a Symmetrix or a host processor. Each STG is also capable of supporting multiple ports.

In the preferred embodiment of the invention, the send message of step 138 contains both identifiers for the STG group and the length of the STG group. Thus, the send message of step 138 actually contains two messages. This information is received by the client process at step 160. Once the client process has received the STG group information, it begins the creation of another socket. The creation of this socket is begun at step 162 through the use of the STPsocket command. This socket can is prefaced by the STP (Symmetrix Transport Protocol) acronym as this is the beginning of the socket calls designed for use to establish a communication through the data storage system. STP is the protocol designed for use with the data storage system. It should be understood that the present invention is not limited to the use of the STP with the STGs.

When the STPsocket call is issued at step 162, it is going to be bound to a dynamically allocated port. At step 162 the socket is bound to the dynamically allocated port. A STPlisten command is issued at step 164. At step 166, the STPgetsockname command is issued in order to obtain the details about the socket. Once the command at step 168 is issued, the information containing the value of the dynamically allocated port is sent back to the server process at step 170. The server process receives this information at step 140 and then establishes a socket beginning at step 142 to begin to establish a connection through the data storage system. Once the socket is created at step 142 with the STPsocket command, it is once again bound, to the dynamically allocated port at step 144.

Then the server process, at step 146, indicates its readiness to establish a connection. The server process then accepts this connection with the STPaccept command at step 172. At this point, a connection has been established through the data storage system. Therefore, the server process and the client process in a file system backup or restore can communicate certain information over the network and other information through the data storage system. In the preferred embodiment of the invention, controller error information is sent over the network, while actual data is sent through the data storage system.

Now turning to FIGS. 5 and 5A, the establishment of the relevant connections for a database backup or restore operation is shown. Once again only the term backup operation will be used. This differs from the process used to establish a backup for a file system in a couple of different ways. First, in a database backup, the client process initiates the communication. Second, although a connection through the network is initially used, in the final analysis all the necessary communications for the database backup operation can occur through the data storage system. It should be understood that, in essence, a network communication is initially established in order to set up a connection through the data storage system.

Once again the operations of the client process are shown under column 180, while the operations of the server process are shown under column 220. As the client initiates the connection, a socket is opened at step 182. This socket is opened up to be bound to a dynamically allocated port and this is done at step 184. Next, at step 186 a listen command is used so that a socket can be aware of any connection request from the server process. At step 188, the getsockname command is used to get the information or value for the dynamically allocated port for the socket.

At step 190, another socket is opened up. This socket is created on the WKP. It is created on the WKP because the server process is waiting for connection on the WKP. This has been set in advance when the backup operation was configured by the user. This socket, created at step 190, is bound at step 192, and indicates its readiness for connection at step 194. The socket created on the WKP is accepted by the server at step 222. Once the server process receives the information that the server process has received the socket on the WKP, it sends the value of the dynamically allocated port to the server process at step 196. This send message is being sent over the WKP. The server process receives this information at step 224. The server process then sends a message to the client process indicating that the connection has been successfully established over the WKP at step 226. This is received by the client process at step 196A.

Since the server process has the information about the dynamically allocated port, the server process is ready to open up a socket for that dynamically allocated port. The socket is opened at step 228 and bound at step 230. The server process indicates its readiness for connection on the dynamically allocated port at step 234. The client process indicates its acceptance of the socket created at step 228 at step 198 through an accept command. As the server process becomes aware that the client process has accepted the socket on a dynamically allocated port, it sends, at step 236, a message identifying the STG group to be used. This information is received by the server process at step 200. It should be understood that the socket created on the WKP is really not being used for anything, its purpose is really just to initiate the steps necessary to establish the connection on the dynamically allocated port, which as will be seen, is really used to establish the connection through the data storage system.

Once the server process has received the information about the dynamically allocated port, and the client process has received an indication that this is a STPsocket, the client process is ready to begin the process to establish a connection through the data storage system. This process begins at step 202 through the use of a STPsocket command. Once the STPsocket has been created, it is bound at step 204. At step

206, an STPlisten command is used to establish a pending queue for connection request. At step 208, through the use of the STPgetsockname command, the port value for the STPsocket is obtained. At step 210, a STPsend command is used to send the value of the newly created STPsocket over the dynamically allocated port. This information is received by the server process at step 238. Once the server process knows the STPsocket is out there, it is ready to begin the creation of an STPsocket in order to complete the connection through the data storage system. At steps 240, 242, and 244, a STPsocket, a STPbind, and a STPconnect command are issued to allow a server process to indicate to the client process its willingness to accept a connection over the STPsocket through the data storage system. At step 212, the client process indicates its readiness to accept the connection through the data storage system. At steps 214 and 246, a close command is issued to close the dynamically allocated (network) socket. This socket can be closed since it is no longer needed for any type of communication in the backup or restore operation.

Having described the preferred embodiment of the present invention, it will now become apparent to those of skill in the art that other embodiments incorporating its concepts may be provided. It is felt, therefore, that this invention should not be limited to the disclosed embodiment, but rather should be limited only by the spirit and scope of the appended claims.

What is claimed is:

1. A computer system comprising:
   first and second processes residing on first and second computers, respectively, the first and second processes being used with at least one of a backup and restore, or backup, or restore operation, wherein each of said first and said second computers are in communication with a data storage system which stores data from at least said first and second computers and a network;
   at least one first communication mechanism residing on each of said first and second computers for facilitating communications between said first and second processes over said network;
   a second communication mechanism residing on each of said first and second computers for facilitating communication between said first and second processes through said data storage system; and
   means for determining whether a communication to be facilitated between said first and second processes is from the first communication mechanism or the second communication mechanism and facilitating the communication between the first process and the second process over said network in response to determining that a communication is from said first communication mechanism, and facilitating the communication between the first process and the second process through said data storage system in response to determining that a communication is from said second communication mechanism, the means for determining being within said first and second processes.

2. The system of claim 1, wherein said first and second processes are part of a backup or restore process.

3. The system of claim 2, wherein said at least one first communication mechanism is a network socket.

4. The system of claim 3, wherein said communication mechanism is a data storage system socket, and information is transferred from said first process to said second process through said data storage system with the data storage socket.

5. The system of claim 1, wherein said backup and restore, or backup, or restore operation is capable of backing up and/or restoring information from file system or database applications.

6. A method for assisting with at least one of a backup and restore, or backup, or restore operation in a computer system, the method comprising, in parallel:
   (a) establishing at least one first connection over a network, between first and second processes that are each used with the at least one of the backup and restore, or backup, or restore operation and that are each residing on different computers, wherein said at least one first connection is configured to be responsively used for communication over a network; and
   (b) establishing a second connection, through a data storage system, between said first and said second processes, wherein said second connection is configured to be responsively used for communication over said data storage system.

7. The method of claim 6, wherein step (a) comprises the step of: creating a first pair of communication mechanisms on a designated port of each of said different computers, wherein said first pair includes a first communication mechanism on said designated port of one computer of said different computers and a second communication mechanism on said designated port of another computer of said different computers.

8. The method of claim 7, wherein step (a) further comprises the steps of:
   requesting, with said first communication mechanism of said communication mechanism pair, a connection to said second communication mechanism of said communication mechanism pair; and
   accepting said connection request.

9. The method of claim 8, wherein step (a) further comprises the step of:
   creating a second pair of communication mechanisms on the designated port of each of said different computers, wherein said second pair includes a first communication mechanism on said designated port of one computer of said different computers and a second communication mechanism on said designated port of another computer of said different computers and wherein said second pair of communication mechanisms is used for transferring a different type of information than would be transferred over said first pair of communication mechanisms.

10. The method of claim 9, wherein step (a) further comprises the steps of:
    requesting with said first communication mechanism of said second pair of communication mechanisms, a connection to said second communication mechanism of said second pair of communication mechanisms; and
    accepting said connection request.

11. The method of claim 10, wherein step (b) comprises the steps of:
    creating a third pair of communication mechanisms on a second designated port, wherein said third pair includes a first communication mechanism and a second communication mechanism.

12. The method of claim 11, wherein step (b) further comprises the steps of:
    requesting with said first communication mechanism of said third pair of communications mechanisms a connection to said second communication mechanism of said second pair of communications mechanisms; and
    accepting said connection request.

13. The method of claim 12, wherein step (b) further comprises the steps of:
    receiving information about a group of resources in said data storage system;
    creating a fourth pair of communication mechanisms in response to receiving information about said group of resources, wherein said fourth pair includes a first communication mechanism and a second communication mechanism; and connecting said first communication mechanism and said second communication mechanism of said fourth pair of communication mechanisms to each other through said data storage system.

14. The method of claim 6, wherein said backup and restore, or backup, or restore operation is for backing up and restoring information from a file system application.

15. A method for assisting with a backup and restore, or backup, or restore operation in a computer system, the method comprising:

establishing a connection, over a network, between a first process and a second process that are each used with a backup and restore, or backup, or restore operation and that are each residing on different computers;

receiving information about a communication mechanism over the established connection;

establishing a second connection over the network, on the communication mechanism, between said first and second processes;

identifying resources on a data storage system to be used in order to transfer information through said data storage system; and establishing a connection between said first and second processes through said data storage system.

16. The method of claim 15, wherein said backup and restore, or backup, or restore operation is used in conjunction with a database application.

17. A computer system comprising:

a first computer having a first process residing thereon and a second computer having a second process residing thereon, the first and second processes including at least one of a backup and restore, or backup, or restore operation;

a network connecting the first computer to the second computer;

a first communication mechanism residing on each of the first and second computers for facilitating communications between the first and second processes over the network; and a data storage system coupled to the first computer and the second computer;

a second communication mechanism residing on each of the first and second computers for facilitating communications between the first and second processes through the data storage system, wherein the first and second processes are configured to determine from which of the first communication mechanism and the second communication mechanism communications between the first and second processes originate, and wherein a communication that originates from the first communication mechanism is transmitted between the first and second processes over the network and a communication that originates from the second communication mechanism is transmitted between the first and second processes through the data storage system.

18. The system of claim 17, wherein said at least one first communication mechanism is a network socket.

19. The system of claim 18, wherein said second communication mechanism is a data storage system socket, and information to be transferred from said first process to said second process through said data storage system passes through said data storage system socket.

20. The system of claim 17, wherein said backup and restore, or backup, or restore operation is capable of backing up and restoring information from file system or database applications.

* * * * *